Patented Dec. 19, 1922.

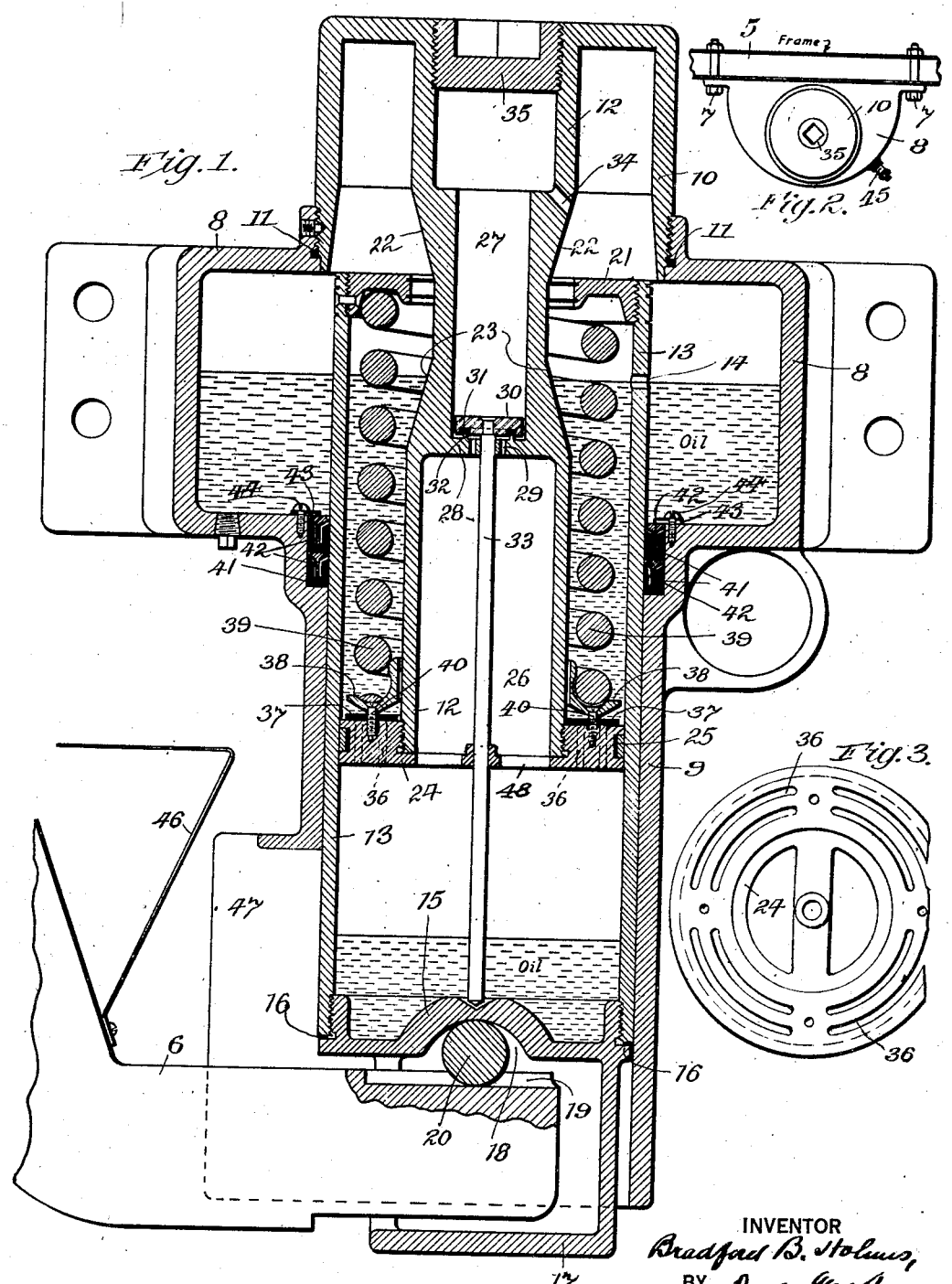

1,439,417

UNITED STATES PATENT OFFICE.

BRADFORD B. HOLMES, OF NEW YORK, N. Y.

PNEUMATIC CUSHION.

Application filed July 3, 1920. Serial No. 393,772.

*To all whom it may concern:*

Be it know that I, BRADFORD B. HOLMES, a citizen of the United States, residing at New York, in the county of New York and State of New York, have invented certain new and useful Improvements in Pneumatic Cushions, of which the following is a specification.

This invention relates to a method of regulating the load sustaining action of pneumatic cushions, and to a cushion structure regulated by such method.

The invention is particularly suited to motor truck suspensions and is shown embodied in a device of this class. The structure includes auxiliary means to cause the regulating device to function properly even after extreme changes of the imposed load. There are also means to check extreme movements of the cushion in both directions. Other features of invention relate to the proper functioning of the device at the high pressures necessary in truck service, and to the securing of the wide range of effective load sustaining action called for by the extreme variation of spring borne load between the empty and loaded conditions of the truck.

Metallic springs, as now almost universally designed for heavy trucks must be proportioned to sustain the maximum load, with a large factor of safety. This factor of safety, together with certain limitations of dimension results in unduly stiff action even under full load. When the truck is empty such springs practically cease to function. The present invention provides a pneumatic cushion which may either be used in lieu of a metallic spring or may be used to supplement the action of a metallic spring, the pneumatic cushion being inherently self regulating as to its effective load-sustaining action, so that full flexibility of the spring suspension is had regardless of the load upon the truck, without liability of injury through over-compression or rebound.

To secure this action I make use of two mechanically related coacting pneumatic cushions, both of which preferably contain some oil in addition to air (or other suitable gas). One of these cushions operates at relatively high pressure, and is characterized by a relatively high ratio of total cushion volume to total piston displacement. The other cushion operates at relatively lower pressure and is characterized by a relatively lower ratio of total cushion volume to total piston displacement. Where, as in the preferred construction, the piston strokes of the two cushions are the same, piston displacement is directly proportional to piston area.

It results from the above characteristics of the two cushions, that as the two cushions are compressed by load shocks, the pressure in the low pressure cushion rises far more rapidly than that in the high pressure cushion, and a point is eventually reached at which the pressure in the low-pressure cushion tends to rise above the pressure in the high-pressure cushion. At such times a check valve opens and permits flow of pressure fluid from the low pressure to the high-pressure cushion, and thereafter prevents back flow. Consequently, load shocks have the effect of increasing the pressure in the high pressure cushion and decreasing pressure in the low-pressure cushion, and since the low-pressure cushion has the larger piston area, the effective load-sustaining resistance of the two cushions is reduced.

This results in a lower load-sustaining position of the two cushions. A bleed valve so constructed as to be held open whenever the cushion structure is below its desired load-sustaining position, permits a relatively slow back flow from the high-pressure to the low-pressure cushion whenever necessary to restore low-pressure cushion pressure.

Obviously this valve is held open during the compression of the cushions by severe load shocks, but at such times the low pressure cushion pressure is abnormally high and any flow is toward the high-pressure cushion. Thus each load shock transfers a relatively large quantity of pressure fluid from the low to the high pressure cushion, but the resulting reduction of pressure in the low pressure cushion is neutralized in the proper degree by a counter flow occurring in the intervals between shocks, and this counterflow is regulated by the extent and duration of the opening of the bleed valve. Such opening is directly controlled by the average load sustaining position of the cushion.

If a truck so equipped, be run under heavy load and then be stopped and unloaded and again run, the cushions would be elongated and so stiff that practically no transfer of pressure to the high pressure cushion could occur, unless some means be provided to increase the flexibility of the cushions under these conditions. This compensating effect I secure by using a metallic spring which opposes the cushions, but comes into action only when these are unduly elongated. Under such conditions the pressure fluctuations in the low pressure cushion are exaggerated by a leakage of oil from the high to the low pressure cushion, this leakage tending to reduce the effective volume of the low pressure cushion. The effect of this is to accelerate transfer of pressure fluid from the low to the high pressure cushion, thus rapidly restoring the cushion to normal riding position and normal flexibility.

The metallic spring above mentioned also serves as a rebound check, its action being reinforced by an oil throttling check or retarder. Extreme load shocks are checked by a pneumatic dash pot, which the general organization of the cushion makes it convenient to provide.

A preferred embodiment of the invention is shown in the accompanying drawing, in which;

Fig. 1 is a vertical axial section,

Fig. 2 is a plan view on a reduced scale, and

Fig. 3 is a plan view of the piston showing the form of the valve ports.

In the drawings the side bar of a truck chassis is shown at 5 and the rear end of a radius rod, in load bearing relation with an axle (not shown) is indicated at 6. These parts merely indicate one way of applying the device and are subject to modification, as the spring may be used in any of various types of truck suspension.

Connected to the side bar 5 by means of bolts 7 is a casting formed with an enlarged chamber 8, and with a downward extending cylindrical guideway 9. Concentric with this guide-way 9 is an opening in the top of the chamber 8. Into this opening is threaded a cap 10, the interior of which forms an extension of the space within the chamber 8, and serves as a dash pot under certain conditions of operation. The cap 10 is screwed down against a gasket 11 to secure a tight joint, and has a central downward projection 12, which carries the low pressure piston, houses the bleed valve and certain chambers, and externally is so formed as to have a graduated throttling function.

Guided in the guide-way 9 and projecting upward into the chamber 8 is the sliding member of the cushion. This is a tubular shell 13 formed with a side port 14 and closed at its lower end by a plug or head 15. As shown, the plug 15 is threaded into the interior of the shell 13 and forms a tight joint therewith, by means of a gasket 16.

The head 15 has a portion 17 which extends beneath the end of the radius rod 6, sufficient clearance being allowed to permit limited movement of the parts. The head 15 is further provided with a transverse channel or recess 18 which, together with a guide-way 19 in the upper face of radius rod 6, confines a thrust roller 20. By means of this the axle thrust against the radius rod is transferred to head 15, and excessive side thrust on head 15 is avoided.

Threaded into the upper end of the shell 13 is a ring or annular head 21 which is designed to cooperate with a portion of the extension 12 to produce a graduated throttling action. The extension 12 is reversely tapered as indicated at 22 and 23, so that in intermediate or normal positions of the shell 13, there is virtually no throttling action, but such action increases at progressively increasing rates, as the shell 13 approaches the limits of its movements in both directions.

The annular space within the cap 10 and surrounding the central extension 12 is designed to receive the end of the shell 13 and the ring 21, and to coact with them as a dash-pot to check extreme inward movement of the shell 13. To secure a smooth entrance of the plunger into this annular dash-pot, the lower portion of the cap 10 is formed with an internal flare as clearly shown in the drawing. This flare, together with the taper 22, lead gradually by a progressive throttling to the more pronounced action of the dash-pot.

Threaded on the lower end of the extension 12 is an annular piston head 24 which is provided with a metallic piston ring 25, causing it to make a relatively tight sliding fit within the shell 13. The central portion of the piston head 24 consists of a spider 48 giving free communication to the chamber 26 formed in the lower end of extension 12. The chamber 26 and the space below piston 24 form the low pressure cushion chamber.

The chamber 26 is cut off from the chamber 27 formed in the upper end of extension 12, by a partition 28 provided with small ports 29 which are controlled by a valve 30. This valve 30 carries a sealing ring 31 which seats on an annular seat 32 surrounding the ports 29. The valve 30 is at times unseated by the collision of the lower end of a rod 33 connected thereto with the head 15. The purpose of the spider 48 is to guide the rod 33. The chamber 27 is a part of the high pressure cushion chamber within the shell 8 and is in constant communication with that space by means of a port 34. For convenience in manufacture and assembling, access is given to the interior of chamber 27 by means of a removable screw plug 35.

The piston 24 is provided with arcuate ports 36 arranged in two annular series, so that considerable area is offered to the passage of air through the piston 24. These ports 36 are controlled by an annular flap valve 37 which serves as a check valve opening to permit pressure fluid to flow from the low pressure cushion space to the high pressure cushion space but closing to prevent flow in a reverse direction. This valve is retained by a ring 38 having a reversely beveled lower face to permit both edges of the valve to rise. The upper side of ring 38 is formed with a helical spring seat and an upwardly projecting flange. This seat receives and confines the lower end of a heavy coiled spring 39. The upper end of this spring will engage the ring 21 if the cushion tends to elongate beyond its normal riding position, i. e., if the shell 13 moves outward beyond the position shown in the drawing. At all other times the spring 39 is entirely inactive. The ring 38 is held in place by screws 40 or by any other suitable means.

In order to prevent leakage from chamber 8 through the sliding joint between the shell 13 and guide-way 9, a pair of cup leathers 41, U-shaped in cross section, are used, one being mounted above the other in a channel surrounding the guide-way 9 at the junction of this guide-way with the chamber 8. Each of these cup leathers is spread by one of two identical rings 42 inserted as shown, the upper one of the two rings 42 is confined by a retaining ring 43 held by screws 44.

A suitable amount of oil may be poured in through the top of the cushion by removing the plug 35. Air may be pumped in under pressure through an air valve 45. This may be similar to the valve used in pneumatic tires, and preferably includes a small check valve opening inward, and a cover cap.

The sheet metal member indicated at 46 is a dust guard which works between flanges 47 at the forward side of the guide extension 9, and is designed to deflect mud and dust thrown up from the road.

Assuming that the device contains a proper amount of oil, (absolute exactness in the amount of oil being by no means essential) air is pumped in through the valve 45 until the pressure in the cushion is sufficient or preferably slightly more than sufficient to sustain, at the normal riding position of the cushion, the maximum dead load to which it will be subjected. Figure 1 shows the parts of the cushion in this normal riding position.

Assume now that the truck is more or less heavily loaded and is driven over a road sufficiently rough to impart load shocks of some intensity, to the cushion. The ratio of the low pressure cushion space to the maximum displacement of piston 24, is rather low, consequently the in and out movements of the shell 13 and its head 15, with reference to the guide member 9, will produce violent pressure fluctuations in the low pressure cushion space. The pressure fluctuations simultaneously produced in high pressure cushion chamber 8 by such movements of the shell 13 will not be so great because the area of the end of shell 13 is small and this area represents the total piston area acting within the chamber 8 and its communicating chamber 27. Consequently the effect of load shocks on the pressure within the low pressure cushion space is to raise that pressure momentarily above the pressure in chamber 8. This will produce momentary flow of pressure fluid through the ports 36 and past the valve 37 into chamber 8. Since the valve 37 prevents back flow, the effect of repeated load shocks is to increase the pressure in chamber 8 and reduce the pressure in the low pressure cushion. This naturally changes the load sustaining position of the cushion, causing the shell 13 to move inward with reference to the guide 9. This eventually results in the unseating of valve 33 in the periods between load shocks, and will permit pressure fluid to flow slowly through the ports 29 from the chamber 8 to the chamber 26. This flow will cease when the normal riding position shall have been restored thereby.

The total effective volume of the low pressure cushion is affected by the amount of oil therein. The purpose of the chamber 26 is to preserve an air cushion space even when the piston 24 contacts with the surface of this oil, so that excess oil may be forced through the ports 36, without shock, by extreme movements of the cushion. Constant slow leakage of oil past the packing ring 25 produces a tendency for oil to accumulate below the piston 24, so there is a constant tendency to reduce the effective volume of the low pressure cushion, and consequently, a tendency to increase the violence of the pressure fluctuations. This action is very useful in accelerating the regulative action in cases where the truck load has been greatly reduced, and it is necessary to transfer considerable pressure fluid from the space below piston 24 to the chamber 8.

One function of the spring 39 is to come into action when the cushion is unduly elongated, and by partially counteracting the load sustaining action of the cushion, it then increases the range of oscillation until the resulting reduction of pressure in the low pressure cushion has restored the cushion to its normal load sustaining position and normal flexibility. Then the spring ceases to function, except to check rebound.

When the cushion is suddenly elongated, there is a tendency to displace a large quantity of oil upward through the space within the ring 21, and the coaction of this ring with the tapered portion 23 of extension 12 gives a checking action by throttling the oil flow. Under very heavy load shocks, the entrance of the ring 21 into the annular dash-pot in cap 10, gives a pronounced and rapidly increasing checking action and absolutely precludes abrupt collision of the parts.

By varying the relative areas of the two cushion pistons, and by varying the relative volumes of the cushions, different cushion characteristics may be secured, both as to the reaction of the cushion to shock and as to its rate of regulative action.

As the area of the high pressure piston is reduced, the high pressure cushion approaches a fixed volume reservoir in form, and function, so that this limiting case is the exact method described and claimed in my prior application, Serial No. 390,159, filed June 19, 1920, to which the present application is subordinate. The method claims of the present application are therefore restricted to regulation by the use of two cushions between which the pressure fluid is transferred, this being a specific variant of the method of said prior application.

Having thus described my invention, what I claim is:—

1. That method of controlling the resultant load sustaining action of two mechanically related cushions arranged to sustain a load conjointly and having different effective piston areas which consists in transferring pressure fluid back and forth between the two cushions.

2. That method of controlling the resultant load sustaining action of two mechanically related cushions arranged to sustain a load conjointly and having different effective piston areas, which consists in effecting a transfer of pressure fluid back and forth between the two cushions, by means of energy absorbed from load shocks.

3. That method of controlling the resultant load sustaining action of two mechanically related cushions arranged to sustain a load conjointly and having different rates of pressure variation for simultaneous cushion movements under load shocks, which consists in permitting a one-way flow of pressure fluid from one cushion to the other when the pressures are differentially increased by load shocks, and controlling a reverse flow of such fluid in the intervals between load shocks according to the load sustaining action of the cushions.

4. That method of controlling the resultant load sustaining action of two mechanically related cushions arranged to sustain a load conjointly and having different rates of pressure variation for simultaneous cushion movements under load shocks, which consists in permitting a one-way flow of pressure fluid from one cushion to the other when the pressures are differentially increased by load shocks and regulating a reverse flow of such fluid by the load sustaining position assumed by the cushions.

5. That method of regulating the load sustaining action of two mechanically related pneumatic cushions arranged to sustain a load conjointly, one of which cushions operates at a relatively high pressure and is characterized by a relatively high ratio of total cushion volume to cushion piston area, and the other of which cushions operates at a relatively lower pressure and is characterized by a relatively lower ratio of total cushion volume to cushion piston area, which consists in permitting a relatively free flow of pressure fluid from the low pressure cushion to the high pressure cushion when cushion pressures are raised by load shocks and regulating a flow of pressure fluid from the high pressure cushion to the low pressure cushion in the intervals between load shocks.

6. That method of regulating the load sustaining action of two mechanically related pneumatic cushions arranged to sustain a load conjointly, one of which cushions operates at a relatively high pressure and is characterized by a relatively high ratio of total cushion volume to cushion piston area, and the other of which cushions operates at a relatively lower pressure and is characterized by a relatively lower ratio of total cushion volume to cushion piston area, which consists in permitting a relatively free flow of pressure fluid from the low pressure cushion to the high pressure cushion when cushion pressures are raised by load shocks and regulating a flow of pressure fluid from the high pressure cushion to the low pressure cushion in the intervals between load shocks, according to the load sustaining position assumed by the cushions.

7. The combination with a pneumatic cushion of the type in which cushion oscillations serve to reduce cushion pressure, and the undue shortening of the cushion serves to bring about increase of cushion pressure, of a spring serving to neutralize partially the load sustaining action of said cushion whenever said cushion is unduly elongated.

8. The combination with a pneumatic cushioning device of the type in which load shocks cause a reduction of effective cushion pressure, of a spring constructed and arranged to be normally inactive but to oppose the extreme elongation of said cushion incident to substantial load reductions, whereby said cushioning device is enabled to respond to load shocks and thereby reduce its load sustaining pressure in periods immediately subsequent to such load reductions.

9. In a pneumatic cushioning device, the combination of two pneumatic cushions, one having a higher ratio of total cushion volume to piston displacement than the other; mechanical connections between said cushions whereby they operate conjointly; a check valve permitting flow from the low ratio cushion to the high ratio cushion and closing against reverse flow; and valve means controlled by the load sustaining position of the cushion and serving to control a flow of pressure fluid from the high ratio cushion to the low ratio cushion.

10. In a pneumatic cushion device, the combination of two pneumatic cushions, one having a higher ratio of total cushion volume to piston displacement than the other; mechanical connections between said cushions whereby they operate conjointly; a check valve having relatively large ports permitting flow from the low ratio cushion to the high ratio cushion and closing against reverse flow; a second valve having restricted ports connecting said cushions; and operative connections for opening and closing said second valve in different load sustaining positions of the cushions.

11. The combination with a cushion of the type containing a liquid and an expansible gas of an auxiliary throttling device serving to check the extension of said cushion by throttling liquid flow within the cushion, said throttling device being operative only near the opposite limits of movement of said cushion.

12. The combination with a pneumatic cushioning device containing a liquid and an expansible gas, of means for producing a flow of said liquid as the cushion elongates; and valve means for controlling said flow constructed and arranged to be gradually closed as the cushion elongates beyond a desired limit.

13. The combination with a pneumatic cushioning device containing a liquid and an expansible gas, of means for producing a flow of said liquid as the cushion elongates; valve means for controlling said flow constructed and arranged to be gradually closed as the cushion elongates beyond a desired limit; and a metal spring positioned to resist elongation of the cushion structure beyond a normal load sustaining position.

14. The combination with a pneumatic cushioning device containing a liquid and an expansible gas, of means for producing a flow of said liquid as the cushion elongates; valve means for controlling said flow constructed and arranged to be gradually closed as the cushion elongates beyond a desired limit; and a dash pot communicating with the space within the cushion and containing gas at the cushion pressure, said dash pot serving to check extreme compressive movements of the cushion.

15. The combination of a casing enclosing a chamber; a tubular guide way communicating with said chamber; a projecting member mounted in the interior of said casing and projecting into said guide way; a fixed piston head carried by said member, smaller than said guide way and concentric therewith; a tubular sleeve closed at its outer end, mounted to slide in the annular space between said guide and said fixed piston head and making a fluid tight joint with each, whereby two variable-volume cushion chambers are produced; a check valve permitting free unidirectional flow from one variable volume chamber to the other; and a bleed valve operated by the movements of said tubular sleeve and controlling a communication between said variable volume chambers.

16. The combination of a casing enclosing a chamber; a tubular guide way communicating with said chamber; a projecting member mounted in the interior of said casing and projecting into said guide way; a fixed piston head carried by said member, smaller than said guide way and concentric therewith; a tubular sleeve closed at its outer end, mounted to slide in the annular space between said guide and said fixed piston head and making a fluid tight joint with each, whereby two variable volume cushion chambers are produced; a check valve permitting free unidirectional flow from one variable volume chamber to the other; a bleed valve operated by the movements of said tubular sleeve and controlling a communication between said variable volume chambers; an annular head fast to the inner end of said sleeve and surrounding said projecting member; and a tapered valve portion formed on said projecting member and serving to cooperate with said surrounding annular head, as the latter moves, to perform a graduated throttling action.

17. The combination of a casing enclosing a chamber; a tubular guide way communicating with said chamber; a projecting member mounted in the interior of said casing and projecting into said guide way; a fixed piston head carried by said member, smaller than said guide way and concentric therewith; a tubular sleeve closed at its outer end, mounted to slide in the annular space between said guide and said fixed piston head and making a fluid tight joint with each, whereby two variable volume cushion chambers are produced; a check valve permitting free unidirectional flow from one variable volume chamber to the other; a bleed valve operated by the movements of said tubular sleeve and controlling a communication between said variable volume chambers; an annular head fast to the inner end of said sleeve and surrounding said projecting member; a tapered valve portion formed on said projecting member and serving to cooperate with said surrounding annular head, as the latter moves, to perform a graduated throttling action; and a spring interposed between said fixed piston head and said annular head and serving to resist undue outward movement of said sleeve.

In testimony whereof I have signed my name to this specification.

BRADFORD B. HOLMES.